United States Patent
Moszoro et al.

(10) Patent No.: US 6,457,427 B1
(45) Date of Patent: Oct. 1, 2002

(54) APPARATUS FOR OBTAINING CONTINUOUS SPEED RATIOS IN A SEEDING OR FERTILIZING MACHINE

(76) Inventors: Antonio Roman Moszoro, Italia 63 bis 10th floor Apt. 1, Rosario-Santa Fe (AR); Nolberto Luis Naldini, San Nicolas 326, Arroyo Seco, Santa Fe-Santa Fe (AR); Roberto Chinelli Santiago, Jr., Vuelta de Obligado 4776, Capital Federal-Buenos Aires (AR); Roberto Chinelli Santiago, Vuelta de Obligado 4776, Capital Federal-Buenos Aires (AR)

( * ) Notice: Subject to any disclaimer, the term of this patent is extended or adjusted under 35 U.S.C. 154(b) by 0 days.

(21) Appl. No.: 10/059,576

(22) Filed: Jan. 29, 2002

Related U.S. Application Data

(63) Continuation of application No. 09/906,017, filed on Jul. 11, 2001, now abandoned.

(30) Foreign Application Priority Data

Jul. 11, 2000 (AR) .......................................... 000103551

(51) Int. Cl.$^7$ ................................................. A01C 7/00
(52) U.S. Cl. ........................... 111/200; 701/50; 111/903
(58) Field of Search ........................... 701/50; 111/200, 111/903, 922

(56) References Cited

U.S. PATENT DOCUMENTS

| | | | | |
|---|---|---|---|---|
| 4,550,704 A | * | 11/1985 | Barho et al. | 123/481 |
| 4,964,533 A | * | 10/1990 | Allington et al. | 222/14 |
| 5,492,440 A | * | 2/1996 | Spaan et al. | 409/80 |
| 5,695,280 A | * | 12/1997 | Baker et al. | 366/17 |
| 6,299,583 B1 | * | 10/2001 | Eggers et al. | 600/526 |
| 6,315,200 B1 | * | 11/2001 | Silverbrook et al. | 235/454 |
| 2001/0049846 A1 | * | 12/2001 | Guzzi et al. | 8/158 |

* cited by examiner

Primary Examiner—Christopher J. Novosad
(74) Attorney, Agent, or Firm—Bernstein & Associates, P.C.; Jason A. Bernstein

(57) ABSTRACT

An apparatus for transmitting drive motion to the members working in dispensing devices and seed and fertilizer dosing devices, equipped to vary the speed of such drive motions according to the operative needs present in each dosing, comprising, in combination, at least one velocity sensor arranged correspondingly with one of the machine supporting wheels, which sensor is integrated to an electronic circuit including the Intelligent Central Unit consisting of a microprocessor having its own software which commands the movements generated by a plurality of Propelling Units, integrated to the same circuit and arranged, individually, correspondingly with each dispenser and dosing device of the machine, coupled to at least one of the members belonging to said dosing devices and dispensers involved in the drive movement and action of each of them.

10 Claims, 1 Drawing Sheet

Figure 1:
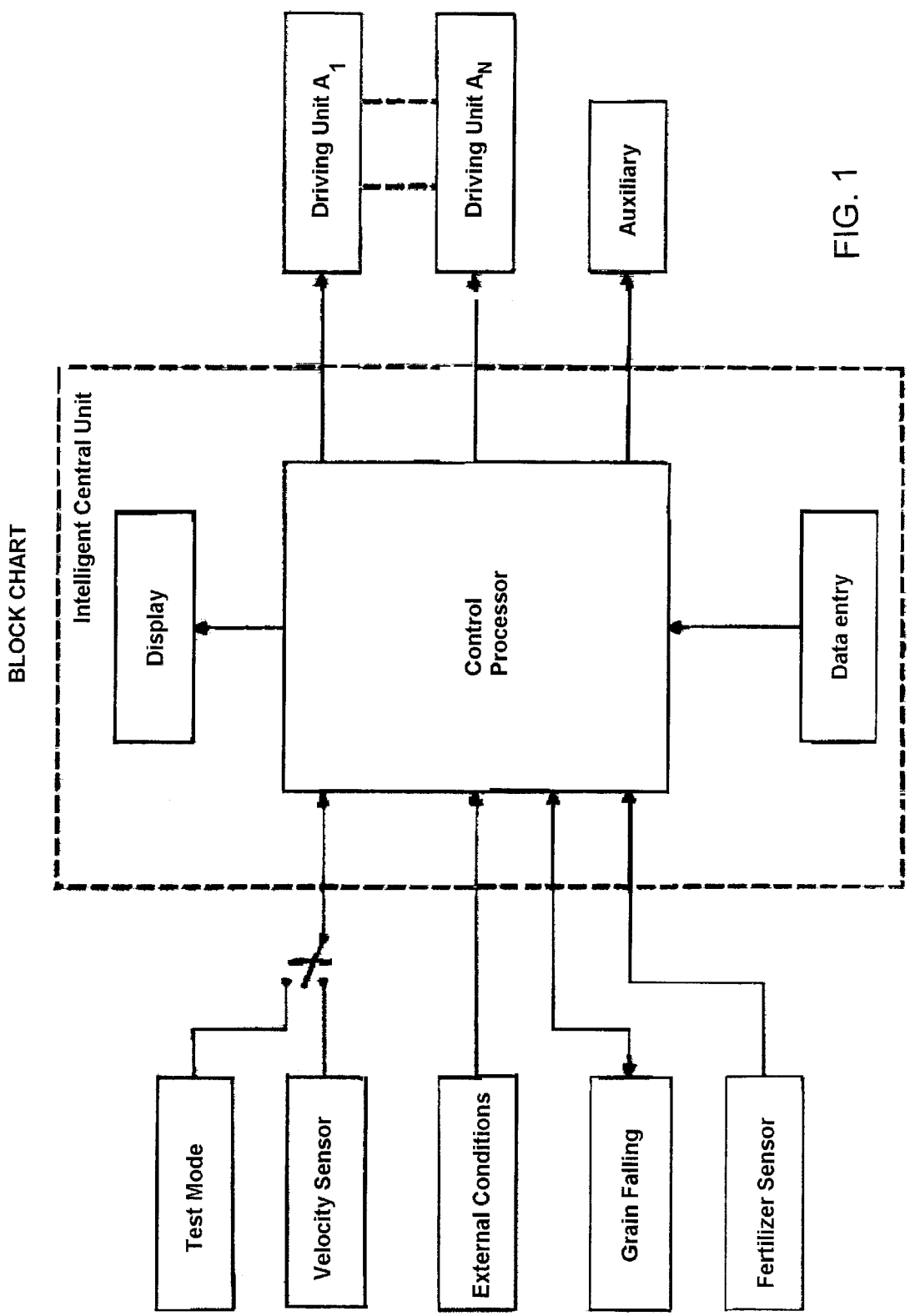

APPARATUS FOR OBTAINING CONTINUOUS SPEED RATIOS IN A SEEDING OR FERTILIZING MACHINE

This is a continuation of application Ser. No. 09/906,017 filed Jul. 11, 2001, now abandoned.

FIELD OF THE INVENTION

The present invention relates to a drive installation consisting of electronic and electromechanical elements to obtain continuous speed ratios without intermediate moveable parts, applicable to seeders, fertilizing machines and/or the like, specially created to be used in seeders, even in those whose seeding drive gear includes the fertilizer dispensing assembly.

More precisely, the present patent of invention protects a special drive installation created to act as a command and drive resource of the seed dispensing devices as well as fertilizer dispensing devices, as the case may be, contained in the agricultural machinery for said purpose, including the seed sorter assemblies, as well as the fertilizer dosing devices.

BACKGROUND OF THE INVENTION

The present invention relates to a totally electronic drive installation which includes speed transducers and information processing elements associated to command devices for engines and/or motoreducers, directly integrated to said assemblies.

The basic novelty is that all the mechanic elements currently used by agricultural machines of the type mentioned above are eliminated, namely: gears, chains, motion boxes, engagements, hydraulic motors, etc., and they are replaced by velocity sensors and microprocessors which command the rate flow performed by seed and/or fertilizer dispensers for their function.

It relates to an adequate installation to apply in fertilizing machines, single or dual, self-propelled or driven, as well as seeders for coarse or fine grains, also self-propelled or driven.

The invented drive installation uses a particular main member, which will be called "driving unit" hereinafter, and which has been specially designed to control and command the dispensers movement according to the different parameters and variables involved in seeding and fertilization cores, said information being processed and forwarded from an "intelligent central unit".

BACKGROUND OF THE ART

If drive installations of movement in the seed and/or fertilizer dispensers currently known are analyzed, three systems may be determined, according to their degree of complexity, namely, those where the dispensers take up control from a single wheel belonging to the train of motion so that, based on the floor, it rotates with its feed; those typically called "half swing", because they use two wheels belonging to the train of motion, from where the movement is taken towards its respective sector on it; those where there are also two drive wheels, but the driving of a differential is included to secure the same number of turns in all the dispensers in the machine.

As it is known, these drive installations use engagements in the drive wheel, an intermediary countershaft, a gearbox (or replacement engagements), a hydraulic motor, a cardan axle or shaft extending as far as the different dispensers.

All these drive assemblies become necessary because the dispensers use rotatory mechanisms to perform their function, therefore, it becomes essential to bring a rotation movement to them.

As defined above, in most cases, this movement is taken from one or two of the holding up wheels belonging to the machine train of motion.

In all the cases, they are drive installations resorting to the use of toothed wheels and chains, where means allowing for the modification of the drive ratio should be inserted; they may consist of gearboxes, of the type lodging engagements in an oil bath, with selector levers, or the well known integral multiple toothed wheels gear changes on the same axle, performing the modification of the engagement due to the displacements of the chain interrelating them. Typically, they use sets of coaxial toothed wheels having a different radius and being replaceable.

It becomes clear from the aforementioned, that any of the engagement systems referred may have one or two different inlet and/or outlet ratios which, in turn, multiply the quantity of apparent changes.

In this manner, drive ratio ranges are achieved, such as: 40, 54, 64 or 81 changes, according to the different manufacturers. In all the cases, the movement achieved is transmitted to a cardan shaft that joins all the fertilizer dispensers, or in any case, to all the seeding modules.

With these mechanic resources, fertilizer dispensing can also be regulated, or, in any case, the seed that is being planted. Typically, a fertilization table or seeding table provided by the manufacturer is used, where the movement of the driving wheel is related to the cardan shaft transmitting movement to the dosing grinders. Said operation is performed on the corresponding motion box and/or its respective engagements and chains.

For these well known cases, the most commonly used dispensers are: the horizontal star type, the upright shaft type, where the number of turns of the star per each advance meter of the machine is fixed (constant driving ratio) and the dose is regulated by the size of fertilizer outlet port.

Those having a toothed wheel and horizontal shaft, made of plastic material and having oblique teeth, of the "chevron" type are also typically used. They may be pulley or grooved roller type. The dose is regulated changing the drive ratio by means of a box, i.e., modifying the number of turns of the dispenser per each advance meter of the machine.

For the regulation of seed dispensing in which the variation of the seeding density must be stated, it should be determined how much each dispenser must throw per each advance meter of the machine. As defined, for setting up work, the "seeding tables" provided by the manufacturer are also used.

Generally, a first calibration is performed in the static, as well as in the dynamic procedure, regulating the machine according to said "table", checking the results. If they are not close to the theoretical and practical values, the mechanisms should be adjusted to achieve the intended results, always working on the engagements and gearboxes.

It should be noted that in the new agricultural accuracy practices, where the dose should vary for different areas within the same batch, it is necessary to use new control elements that achieve said objective and/or are able to vary the drive ratio constantly.

In certain cases, it is necessary to separate the operation of the kinematic train which drives the different dispensers from the wheel of the machine itself. For this purpose, hydraulic motors, capable of varying the number of revolutions they produce, are used. These hydraulic motors supply movement to the rest of the traditional kinematic train. The hydraulic source may come from the dragging tractor, through a connection to the circuit in the equipment prepared for said purpose. In tractors having a hydraulic system not equipped for these uses, an independent hydraulic pump is installed, having its corresponding oil storage, and being driven by the power intake.

When granulated insecticides, as well as the seeds are applied on the drills where the seeds are planted, other hoppers with mechanic dispensers are used, thus adjusting the dose by means of the change in the kinematic train drive index.

It may also be added that the seed dispenser is the member in charge of controlling the seed flow, according to the seeding rate required by the crop.

From the operative viewpoint, typically, each seed is treated as an isolated particle, individualized from the rest. For this purpose, two types of dispensers are known, namely, mechanic, which, in turn, may be horizontal or oblique, and pneumatic.

In both cases, the above mentioned individualization consists of placing each seed on each of the perforations of a rotatory clamp which lets them exit one by one.

In these cases, the regulation of the seeding rate is always carried out by means of the machine transmission box, with which the speed of the feeding star is varied and by means of the position of the shuttering plate that must be adopted for each rate.

High working velocities are not always possible in mechanic dispensers. In this sense, it should be considered that high velocities not only affect the quality of distribution but the seed delivery security may be impaired, as well in certain mechanisms.

From the above, it is clear that all the agricultural machines of the type mentioned above, are based on the principle of obtaining a variable ratio between the driving wheel and the cardan axle or dosing axle that moves the dispensing and distributing members, using complex mechanic systems which include: engagements, chains, gearboxes, clutches, mechanic shifters, articulated cardan shafts, hydraulic systems, etc.

It should be noted that, as a consequence of the use of said mechanic drive installations, a series of drawbacks become apparent; the following are the most significant:

Complex movement systems

Complex calibration boxes and setting up

Multiple reducer boxes, engagements and chains

Multiple cardan shafts with difficulties for alignment

Need of strict and continuous maintenance

Periodical lubrication system

Much time spent in assembling the mechanic systems ex-works.

Uneven wear of the engagements.

Large quantities of pieces which are necessary to keep as spare parts.

Difficult change of the distance between the drills.

Higher costs for storing spare parts stock at the distributors' facilities.

Complex system of variation of the fertilization rate (kg/ha)

Complex system of variation of seeding rate

Range of stepped fertilization rate.

Range of stepped seeding rate.

Need to stop the "equipment" to perform the variation of fertilization rate.

Need to stop the "equipment" to perform the variation of seeding rate.

Higher total weight of the equipment

Longer downtime due to breakings and/or pieces wear.

Great complexity to transform the machine from rating condition to transport condition.

Problems with accumulation of dust/grease on the engagements and chains.

Larger quantity of pieces exposed to blows and/or breakings.

DETAILED DESCRIPTION OF THE INVENTION

The main drawbacks are clearly overcome by a drive installation consisting of electronic and electromechanical elements to obtain continuous speed ratios, without intermediate moveable parts in seeders and the like, which comprises the use of velocity sensors associated with an intelligent central unit from which the drive of the associated propelling units commands the fertilizer and/or seed dispenser devices.

The invented installation works basically in the following manner: once installed and connected to a power source, through a "display" containing a customized menu of the machine, the different parameters involved in fertilization and seeding actions are chosen; the following being the most significant: single or dual; type of fertilizer to be used; distance between drills; kilograms per hectare for each type of fertilizer; to activate the fertilizer detector or alarm in case of lack of fertilizer.

Similarly, the type of seed dispenser type to be used is programmed (pneumatic, horizontal or oblique); also the type of grain to plant (corn, sunflower, soy 70, soy 72, sorghum, black bean, albumen white bean, red bean, peanut, Mexican chickpea, elderberry, lint-free cotton and safflower, etc); the distance for seeding, defined between a usual minimum and maximum in the country for each type of grain.

Once these data have been entered, the machine will be ready, automatically by clicking on a key, to start moving with the following main advantages:

There is no need to calibrate or set up the machine:

The movement of dosing devices, performed by means of driving units, takes place at speeds set through a mathematical algorithm that takes into account the data entered and the speed at which the equipment advances.

Accordingly, it is an aspect of the present invention to provide a transmission installation consisting of electronic and electromechanical elements intended to obtain continuous speed ratios without intermediate moveable parts, applicable to seeders and similar machines, specially for the purpose of transmitting drive motion to the members working in dispensing devices and seed and fertilizer dosing devices, qualified to vary the speed of such drive motions according to the operating needs of each dosing which comprises in combination at least one velocity sensor arranged correspondingly with one of the supporting wheels of the machine, which sensor is arranged forming part of an electronic circuit that includes the Intelligent Central Unit composed of a microprocessor having its own "software" to operate the motion generated by a plurality of Driving Units, which form an integral part of such circuit and are arranged, individually, correspondingly with each dosing device and dispensing device of the machine, attached to at least one of the members belonging to such dosing devices and dispensing devices that take part in the drive motion and operation of each of them.

The mentioned sensor is arranged correspondingly with an drive wheel which, belonging to the machine, is located in the front sector resting on the floor and consists of a pulse generator (according to advance speed) attached to the shaft of a wheel of the machine; it should also be seen that it be a voltage source (which generates voltage according to advance speed of the machine) attached to the shaft of a wheel of the machine, or even a "GPS" (Global Position System).

It is also noted that the electronic circuit includes a "test mode" equipment (simulator) that comprises an additional pulse generator associated with the same microprocessor.

It is also seen that the microprocessor include a self-check display means.

Furthermore, the present invention emphasizes that the electronic circuit includes a grain falling monitoring sensor associated with an alarm signal and arranged correspondingly with each (cereal and fertilizer) dosing device of the machine.

On the other hand, the driving units arranged correspondingly with each dosing dispensing device consist of an electronic circuit and an engine.

It is also seen that the driving units arranged correspondingly with each dosing dispensing device consist of an electronic circuit, an engine and a speed reducer.

DESCRIPTION OF A PREFERRED EXAMPLE

In order to implement the advantages briefly described, below there is a description of one preferred example of an embodiment, which example is described with reference to FIG. 1.

The installation of the present invention comprises the interconnection of electronic and electromechanical elements for the purpose of commanding and driving mechanic resources obtaining continuous speed ratios without intermediate moveable parts.

Information intake is obtained through at least one velocity sensor mounted preferably radially/axially on the driving wheel or drive wheel of the agricultural machines (seeders, fertilizing machines, whether they be crowding or dragging machines and/or self-propelled machines), the motion information of which is processed and turned into useful data necessary to determine the turn of the mechanic members which define the very dosing devices.

It is a real electronic motion box, which is in charge of varying the movement of such mechanic members or means constantly, this feature being the big difference between this box and a conventional motion box, which has a discontinuous or "skipped" variation.

It is clearly understood from the foregoing that traditional mechanic transmission resources (i.e., chains, replacement engagements, articulated cardan shafts, cardan joints, transmission boxes, mechanic speed shifters, clutches, tensioners and innumerable springs, bushings and roller bearings) are drastically done away with.

In order to implement the installation of the present invention, you must resort to a microprocessor among the ones available in market which are interconnected through electric conductors with the Velocity Sensor and the Intelligent Central Unit (the brain of the machine since such microprocessor is contained in it) mentioned above.

The Driving Units mentioned above are arranged correspondingly with each seed and/or fertilizer dosing dispensing device, and comprise an electronic circuit forming an integral part of the command, an engine and a reducer that is attached to the mechanic command shaft of such dosing devices.

Description of FIG. 1

Control/Processor

The control/processor processes all the information received from peripherals by means of its own software that checks the outputs. That is, by means of a program especially designed for that purpose, it resolves the pre-established algorithms necessary to associate the displacement speed of agricultural machines (seeders, fertilizer machines, pulverizers, etc.) with the right rotation motion needed by the different dosing devices according to the parameters established. In order to achieve the foregoing, microprocessors available in market are used.

Velocity Sensor

Velocity sensor is in charge of utilizing the lineal displacement motion of the machine to turn it into information that fits the microprocessor (Control/Processor). Any of the elements that may be used to this end can provide information about displacement speed. These elements can be:

a) An encoder or pulse generator to be arranged attached (radially/axially) to the driving wheel shaft; it generates a frequency that is proportional to displacement speed.

b) A voltage source, which produces a tension that is proportional to displacement speed.

c) A G.P.S. (Global Position System), through which the information mentioned above is received via satellite.

In a) and b) the elements described are associated with a driving wheel or drive wheel directly, for which purpose conventional resources such as flexible joints are used.

Test Mode

Test mode is an ancillary piece of equipment the purpose of which is to simulate the operation of a seeder, or a fertilizing machine, as the case may be, without actually operating the machine so that the correct work of dosing devices can be verified. By means of an "encoder" or additional pulse generator, which replaces the driving wheel encoder, this simulator provides the microprocessor with all the information that should be provided by the latter but which is not provided because the machine is out of work and motionless.

This result can be obtained by two different ways:

a) A variable voltage source with a tension/frequency converter.

b) An engine with a speed regulator attached to an encoder.

This Mode allows testing all the dosing devices of the machine as a whole and/or adjust each of them individually. Alternatively, it allows adjustment of seeding dosing devices, fertilizer dosing devices or both, according to what users need.

External Conditions

External conditions are the external parameters that define and/or determine the situation of agricultural machine, i.e., out of work, the seeder upwards, optional. Information is provided to Control/Processor according to the situation or state of the machine so that, once such information has been processed, it may respond to the requirements of users according to the state of the machine at that moment.

Thus, you may use only the seeder or both parts as a whole, as the case may be.

Data Entry

It is a mini processor command keyboard by means of which workers set up the machine to work. It basically consists of the entry of the functions selected from the menu, including but not limited to the following details about how these data can be entered:

| MODE | | | | | |
|---|---|---|---|---|---|
| Clicking a key successively there will appear | | | | | |
| Kg/Ha | | | | | |
| | | - Fertilizer | YES | | NO |
| min. | max. | | | | |
| 40 | 400 | | | | |
| | | - Grain detector | YES | | NO |
| Relay/Alarm | | | | | |
| mts. b/seeds | | | | | |
| | | - Seeder | YES | | NO |
| min. | max. | | | | |
| | | | YES | Oblique | NO |
| Corn | Yes/No | 150 | 350 | | |
| Sunflower | | 220 | 350 | | |
| Soy 70 | | 20 | 50 | | |
| Soy 52 | | 36 | 60 | | |
| Sorghum | | 40 | 60 | | |
| Blackbean | | 55 | 90 | | |
| Albumen white bean | | 40 | 75 | | |
| Redbean | | 75 | 180 | | |
| Peanut | | 47 | 85 | | |
| Mexican chickpea | | 45 | 80 | | |
| Elderberry | | 45 | 80 | | |
| Lint-free cotton | | 35 | 60 | | |
| Safflower | | 75 | 180 | | |
| | | | YES | Horizontal | NO |
| Corn | Yes/No | 150 | 370 | | |
| Sunflower | | 170 | 370 | | |
| Chickpea | | 45 | 80 | | |
| Soy 70 | | 20 | 50 | | |
| Soy 52 | | 45 | 60 | | |
| Sorghum | | 40 | 65 | | |
| Black bean | | 55 | 90 | | |
| Albumen white bean | | 40 | 75 | | |
| Red bean | | 75 | 185 | | |
| Linter-free cotton | | 35 | 64 | | |
| Peanut | | 45 | 85 | | |
| Display | | | | | |

It is used to see the data entered in Control/Processor upon "preparation" of the machine and during operation it shows displacement speed. As a special feature it has self-checking and self-diagnosis of the circuit and the operations it should perform.

Example of circuit self-checking: feeding voltage.

Example of self-diagnosis: the machine is moving around and no grains fall; this may mean that hoppers are empty, or the conduit that guides grain falling is blocked.

Grain Falling

It is a sensor that monitors grain falling and warns if any seed has not fallen along the conduit that guides grains to the floor.

As a special feature it gives an alarm signal if grain falling is not correct.

Producers get the benefit of preventive control of seed falling, which fact avoids going over hectares in the event a drill is left without seeding.

Grain detection is performed by means of optocouplers, which can be diodes, transistors, thyristors. The sensor checks every sensor that has been installed, and thus, it controls the number of drills ready to be seeded.

Such indications will be either in visual or acoustic form.

Driving Unit A1

Driving Units are devices that interpret and/or produce by channel A (the name given to seed or fertilizer dosing devices arranged in such way as to dose, each of them, the same quantity) the turn of the members of the dosing device according to parameters sent from Control/Processor.

Up to 32 units can be coupled in parallel.

This unit can be composed of:

a) an electronic circuit and an engine;

b) an electronic circuit, an engine and a reducer.

As a special feature, the electronic circuit turns the information sent from the microprocessor into a speed proportional to the pack of data received.

There are no restrictions on the type of motor to be used with the new device provided that the operations to be performed by it are not overlooked.

In this selected example a stepping engine is used due to its versatility and relative low cost.

The reducer is used to increase torque where necessary. The reducer can be any of the ones available in market.

Auxiliary Elements

A relay or output alarm is used. It consists of additional electric outputs which enable connection of alarms or of elements indicators of abnormalities.

Their purpose is to inform users that some element or device in the machine is not working well. Auxiliaries can be easily seen elements such as an intermittent light source, or auditory elements such as a horn or a siren.

We claim:

1. A drive installation incorporated into a seeding or fertilizing machine for obtaining continuous speed ratios without intermediate moveable parts, said machine comprising at least one supporting wheel, a drive wheel having a shaft, a dispenser, a plurality of propelling units, at least one dosing device, and a drive movement, comprising, in combination:

a) at least one velocity sensor arranged correspondingly with one of said machine supporting wheels; and, b) an electronic circuit including an Intelligent Central Unit comprising a microprocessor having software associated therewith which controls the movements generated by said plurality of Propelling Units, integrated to the same circuit and arranged, individually, correspondingly with each dispenser and dosing device owned by the machine, coupled to at least one of the members belonging to said dosing devices and dispensers involved in the drive movement and action of each of them.

2. The drive installation of claim 1, wherein said sensor is arranged in electrical communication with said drive wheel that, belonging to and placed at a front sector based on the floor of said machine.

3. The drive installation of claim 1, wherein said sensor is a pulse generator (defined according to the advance rate) coupled to said shaft of one wheel of said machine.

4. The drive installation of claim 1, wherein said sensor is a voltage source (defined voltage producer according to the advance rate of the machine) coupled to said shaft of one wheel of said machine.

5. The drive installation of claim 1, wherein the sensor is a "GPS" (Global Position System).

6. The drive installation of claim 1, wherein said electronic circuit further comprises a "test mode" equipment (simulator) comprising an additional pulse generator, associated with said microprocessor.

7. The drive installation of claim 1, wherein said microprocessor further comprises a self-check display means.

8. The drive installation of claim 1, wherein said electronic circuit further comprises a grain falling monitoring sensor and an alarm signal associated therewith, arranged correspondingly with each said dosing device of said machine.

9. The drive installation of claim 1, wherein said propelling units arranged correspondingly with each said dosing dispenser comprise an electronic circuit and an engine.

10. The drive installation of claim 1, wherein said propelling units arranged correspondingly with each dosing dispenser comprise a) an electronic circuit;

b) an engine; and c) a speed reducer.

* * * * *

UNITED STATES PATENT AND TRADEMARK OFFICE
CERTIFICATE OF CORRECTION

PATENT NO.     : 6,457,427 B1
DATED          : October 1, 2002
INVENTOR(S)    : Antonio Roman Moszoro It is certified that error appears in the above-identified patent and that said Letters Patent is hereby corrected as shown below:

<u>Title page,</u>
Item [12], delete "Moszoro et al." and insert -- Moszoro -- therefor.
Item [76], delete "Antonio Roman Moszoro, Italia 63 bis 10th floor, Apt. 1, Rosario-Santa Fe (AR); Nolberto Luis Naldini, San Nicolas 326, Arroyo Seco, Santa Fe-SantaFe (AR); Roberto Chinelli Santiago, Jr., Vuelta de obligado 4776, Capital Federal-Buenos Aires (AR); Roberto Chinelli Santiago, Vuelta de Obligado 4776, Capital Federal-Buenos Aires (AR)" and insert -- Antonio Romano Moszoro, Italia 63 bis 10th Floor, Apt. 1, Rosario-Santa Fe (AR) --

Signed and Sealed this

Tenth Day of December, 2002

JAMES E. ROGAN
*Director of the United States Patent and Trademark Office*